C. S. CAMPBELL.
ICE MACHINE.
APPLICATION FILED MAR. 21, 1911.

1,014,449.

Patented Jan. 9, 1912.

Witnesses
Byron B. Collings
Geo. H. Byrne

Inventor
C. S. Campbell
by Wilkinson Fisher &
Witherspoon
Attorneys

UNITED STATES PATENT OFFICE.

CHARLES S. CAMPBELL, OF ATLANTA, GEORGIA.

ICE-MACHINE.

1,014,449.  Specification of Letters Patent.  Patented Jan. 9, 1912.

Application filed March 21, 1911. Serial No. 615,987.

*To all whom it may concern:*

Be it known that I, CHARLES S. CAMPBELL, a citizen of the United States, residing at Atlanta, in the county of Fulton and State of Georgia, have invented certain new and useful Improvements in Ice-Machines; and I do hereby declare the following to be a full, clear, and exact description of the invention, such as will enable others skilled in the art to which it appertains to make and use the same.

This invention relates to ice machines, and has for its object to provide a tank and a freezing means so located in connection therewith that should an accident happen to the latter, repairs could be made with a minimum delay.

To these ends the invention consists in the novel combinations of parts and details of construction more fully hereinafter disclosed and particularly pointed out in the claims.

Figure 1:
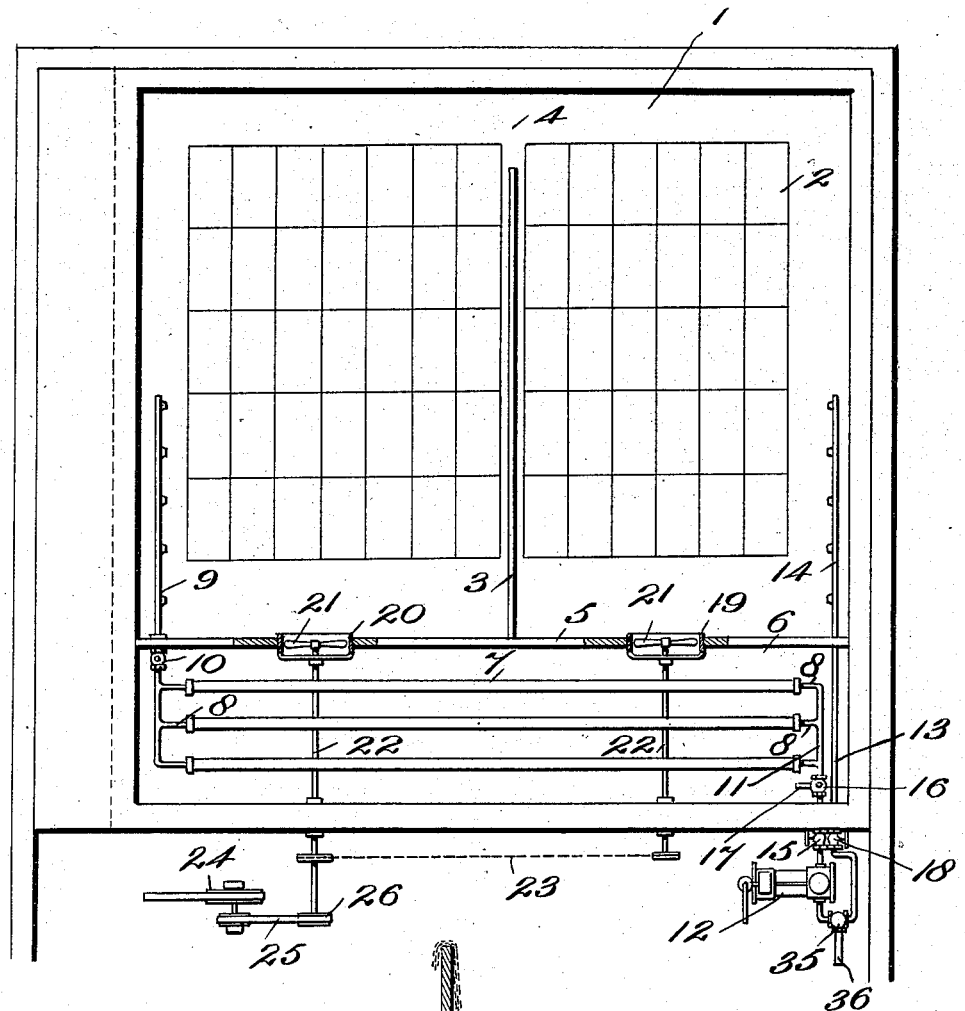
Figure 2:
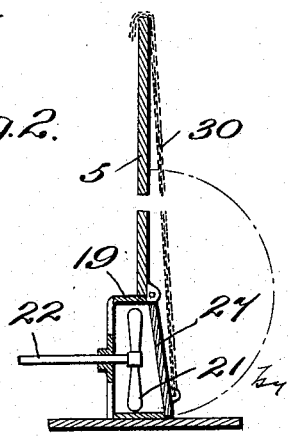

Referring to the accompanying drawings forming a part of this specification in which like numerals designate like parts in all the views, Figure 1 is a diagrammatic plan view of a freezing tank made in accordance with my invention; and Fig. 2 is a sectional detail view of one of the circulating pipes and closure therefor.

1 indicates any suitable freezing tank in which are suitably located the freezing cans 2, and 3 indicates a partition dividing the said tank into two portions and leaving a passage 4 for circulating the brine between the said parts. 5 indicates a partition extending entirely across the tank 1 and providing the chamber 6 in which is located the refrigerating coils 7. The said coils, as is well known, are usually provided with the brine pipes 8 associated with the same, and I connect the suction ends of these pipes with a suitable header, such as 9, which may be provided with a valve 10, and the other ends of the said pipes 8 I connect as by the pipe 11 with the suction side of the pump 12 as shown. The delivery side of the pump is connected as by the pipe 13 with the header 14 delivering into the tank 1. Suitable valves 15 and 16 are placed in the pipe 11. I also prefer to place a connection 17 controlled by the valve 16 in said pipe for the purpose to be disclosed below. A valve 18 may also be placed in the pipe 13 to control the delivery from the same.

In the partition 5 I provide a plurality of circulating channels or short pipes 19 and 20, and in each pipe I preferably place a propeller or other circulating means 21, as shown. These propellers may be conveniently mounted upon the shafts 22 and rotated as by a belt 23 from the power pulley 24 driving the connections 25 and 26, or by any other suitable means.

Over each of the pipes or rings 19 and 20 I provide any suitable closure such for example as a flap valve 27 adapted to fit snugly the circulating pipe and to therefore cut off communication between the tank 1 and the chamber or compartment 6. Said valves or closures may be operated by any suitable means as for example, the chains 30 passing upwardly over the partition 5.

As is well known in freezing tanks now in common use, the refrigerating coils 7 are located in the same compartment as the cans 2, or if they are not located in said compartment, there is no means at present provided for cutting off communication between the compartment in which the cans are located from the compartment in which the coils may be placed. It results from this that any accident which may happen to the coils causes a shut-down of the entire tank, and frequently entails vexatious and expensive delays extending over days and sometimes weeks. These delays are found to be exceedingly annoying and objectionable in ice factories, and the invention above disclosed entirely obviates them as will now be made clear. That is to say the brine is ordinarily circulated through the tank 1 by means of the propellers 21 operating in opposite directions and is forced to traverse the passage 4 in the manner well known. But owing to the fact that the refrigerating coils 7 are in a separate compartment should any accident happen to said coils or even to said tank, all that is necessary to do is to lower the valves 27 and thereupon cut off communication between the said tank 1 and the compartment 6. The pump 12 may now be utilized to pump out the compartment 6 by merely closing the valves 10 and 18 and opening the valves 16 and 35, whereupon the brine will be sucked in through the pipe 17 and discharged through the pipe 36. On the other hand should it be desired to pump out the tank 1 the valve 10 may be opened and the valve 16 and 18 closed when the brine will enter through the header 9 and be discharged through the pipe 36. In either case the refrigerating coils or the tank may be repaired without delaying the operation of the other. And this is found to be especially convenient when it comes to repairing the refrigerating coils, which is a matter of comparatively frequent occurrence in ice factories. Further if the circulation of the brine by means of the propellers 21 is not satisfactory, or is insufficient, the pump 12 may be utilized to maintain a constant circulation by merely closing the valves 16 and 35, and sucking in fluid through the header 9 and discharging it through the header 14. By this means the brine, which constantly passes through the coils 7, is at its lowest temperature, and serves to lower the temperature of the tank 1 very quickly.

It is obvious that those skilled in the art may vary the arrangement of parts and details of construction without departing from the spirit of my invention, and therefore I do not wish to be limited to such features except as may be required by the claims.

What I claim is:—

1. In an ice machine the combination of a freezing tank; cooling coils located in a compartment separated from said tank, pipes for the circulation of brine between said compartment and tank; mechanical means in said pipes for causing a constant circulation of said brine between said compartment and tank; means for closing said pipes at will and thereupon isolating said compartment from said tank; and means for emptying said compartment, substantially as described.

2. In an ice machine the combination of a freezing tank; a partition provided with brine circulating passages and extending across the same to form a compartment; freezing coils in said compartment; a pump communicating with said compartment and tank; means located in said passages for circulating brine between said compartment and tank; and means for closing said passages and isolating said compartment substantially as described.

3. In an ice machine the combination of a freezing tank; a partition provided with brine circulating passages and extending across the same to form a compartment; freezing coils in said compartment; a pump provided with valved passages communicating with said compartment and tank; means comprising propellers located in said passages for circulating brine between said compartment and tank; means for rotating said propellers; and means for closing said passages and isolating said compartment, substantially as described.

4. In an ice machine the combination of a freezing tank provided with a partition extending partially across the same to form a circulating passage; a second partition having circulating passages extending entirely across the said tank to form a compartment; a freezing coil located in said compartment; brine pipes associated with said coil, a header fitted to said pipes and located in said tank; a pump connected to said pipes and to said tank; means located in said last named passages for maintaining a constant circulation of brine through all of said passages; and means comprising a pivoted valve for closing said second mentioned passages and isolating said compartment, substantially as described.

5. In an ice machine the combination of a freezing tank provided with a partition extending partially across the same to form a circulating passage; a second partition having circulating passages extending entirely across the said tank to form a compartment; a freezing coil located in said compartment; brine pipes associated with said coil; a header fitted to said pipes and located in said tank; a pump connected to said pipes and to said tank; valves associated with said connections for cutting off communication between said pump and tank; additional connections between said pump and compartment by which the latter may be emptied by said pump; means located in said last named passages for maintaining a constant circulation of brine through all of said passages; and means comprising a pivoted valve for closing said second mentioned passages and isolating said compartment, substantially as described.

6. In an ice machine the combination of a tank provided with a partition having valve controlled passages and forming a compartment, a cooling means located in said compartment; propellers located in said passages adapted to circulate a cooling fluid through said compartment and tank; means to open and close the valves controlling said passages; and a pump provided with means for emptying said tank, substantially as described.

In testimony whereof, I affix my signature, in presence of two witnesses.

CHARLES S. CAMPBELL.

Witnesses:
F. R. GRAHAME,
T. H. SIMMONS.

Copies of this patent may be obtained for five cents each, by addressing the "Commissioner of Patents, Washington, D. C."